US008813422B1

(12) United States Patent
Laudenklos

(10) Patent No.: US 8,813,422 B1
(45) Date of Patent: Aug. 26, 2014

(54) TOMATO PLANT SUPPORT STRUCTURE

(71) Applicant: James Laudenklos, Newman Grove, NE (US)

(72) Inventor: James Laudenklos, Newman Grove, NE (US)

( * ) Notice: Subject to any disclaimer, the term of this patent is extended or adjusted under 35 U.S.C. 154(b) by 0 days.

(21) Appl. No.: 13/784,078

(22) Filed: Mar. 4, 2013

(51) Int. Cl.
*A01G 17/04* (2006.01)
*A01G 9/12* (2006.01)

(52) U.S. Cl.
CPC . *A01G 9/12* (2013.01); *A01G 17/04* (2013.01)
USPC .................................................. 47/47; 47/44

(58) Field of Classification Search
USPC ....................................................... 47/47, 45
See application file for complete search history.

(56) References Cited

U.S. PATENT DOCUMENTS

| | | | |
|---|---|---|---|
| 425,745 A * | 4/1890 | Brown | 47/47 |
| 670,144 A * | 3/1901 | Bond | 248/125.3 |
| 1,556,373 A * | 10/1925 | Thoeni | 47/47 |
| 2,557,731 A | 6/1951 | Felsing | |
| 3,731,429 A * | 5/1973 | Orthman | 47/47 |
| 3,778,929 A * | 12/1973 | Pearson | 47/58.1 R |
| 4,503,636 A | 3/1985 | Stuckey | |
| 4,858,380 A * | 8/1989 | Gayle | 47/45 |
| 4,914,857 A * | 4/1990 | Dodgen | 47/47 |
| 5,179,799 A | 1/1993 | Hillestad | |
| 5,595,019 A * | 1/1997 | Foreman | 47/47 |
| 6,000,172 A | 12/1999 | Ballarino | |
| 7,043,876 B2 * | 5/2006 | LaPelusa | 47/47 |
| 7,219,467 B1 | 5/2007 | Branman | |
| 2004/0216372 A1 * | 11/2004 | Voogt | 47/39 |

* cited by examiner

*Primary Examiner* — Son T Nguyen
(74) *Attorney, Agent, or Firm* — Dennis L. Thomte; Thomte Patent Law Office LLC

(57) ABSTRACT

A plant support structure is provided which is ideally suited for use with tomato plants. The structure includes a vertically disposed post with the lower end thereof being driven into the ground. A plurality of vertically spaced-apart support ring assemblies are secured to the post and which may be vertically adjusted with respect thereto. Each of the support ring assemblies includes a first ring member, a second ring member and a third ring member with elongated rods interconnecting the same.

2 Claims, 4 Drawing Sheets

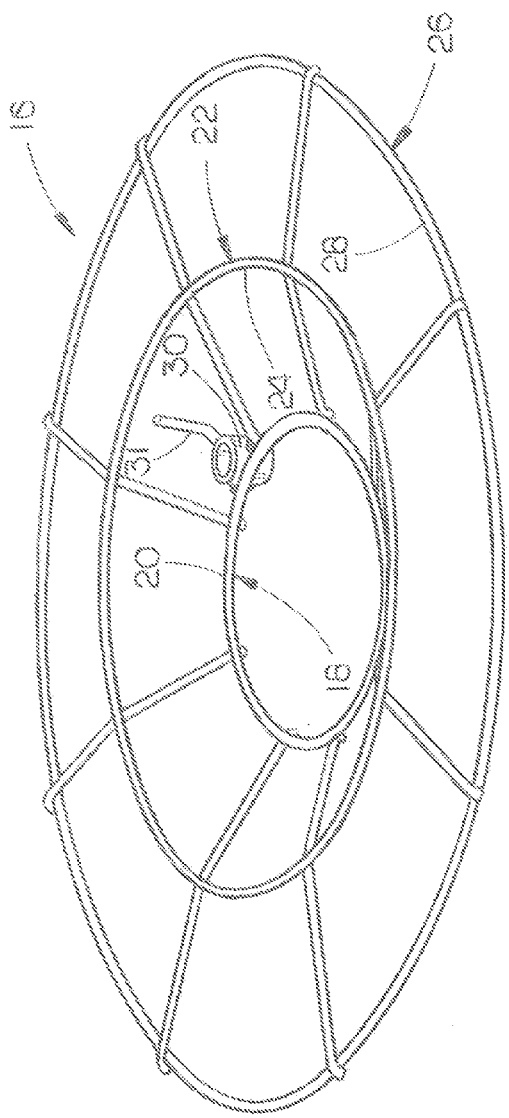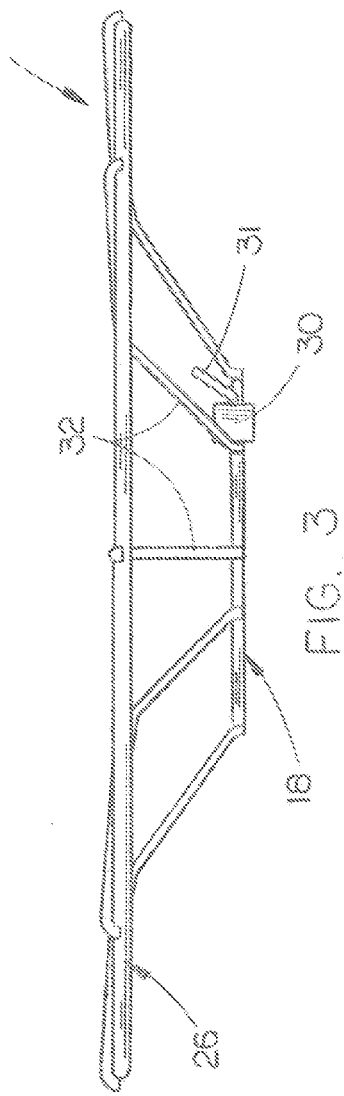

TOMATO PLANT SUPPORT STRUCTURE

BACKGROUND OF THE INVENTION

1. Field of the Invention

This invention relates to a plant support structure and more particularly to a tomato plant support structure comprising a plurality of vertically spaced-apart support frames which are vertically adjustably mounted on a support post.

2. Description of the Related Art

Many types of tomato plant support structures have been previously provided to support a growing tomato plant off the ground. See for example U.S. Pat. No. 6,000,172 and the patents cited therein. To the best of Applicant's knowledge, no one has previously provided a tomato plant support structure which includes a plurality of vertically spaced-apart support frames which are selectively vertically adjustable with respect to a support post and which have a design to adequately support the tomato plant and tomatoes thereon as the tomato plant grows. Further, it is not believed that any of the prior art tomato plant support structures include a support post which may be comprised of two or more support post sections which are selectively secured together to increase the height of the support post as the tomato plant grows.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tomato plant support structure is disclosed which includes an upstanding post having a lower end for insertion into the ground and an upper end. The support post may be comprised of two or more post sections which may be secured together in an end-to-end relationship as the plant grows. A plurality of identical vertically spaced-apart support ring assemblies are selectively vertically adjustably secured to the post. Each of the support ring assemblies comprises: (a) a first horizontally disposed ring member having a periphery; (b) a second horizontally disposed ring member having a periphery with the second ring member having a greater diameter than the diameter of the first ring member with the periphery of the second ring member being spaced outwardly of the periphery of the first ring member in a concentric manner; (c) a third horizontally disposed ring member having a periphery with the third ring member having a greater diameter than the diameter of the second ring member and with the periphery of the third ring member being spaced outwardly of the periphery of the second ring member in a concentric manner; (d) a plurality of elongated rods having inner and outer ends with the inner ends of the rods being secured to the periphery of the first ring member and extending outwardly therefrom in a radially spaced-apart manner with the outer ends of the rods being secured to the periphery of the third ring member and with the rods being secured, intermediate the inner end and outer ends thereof, to the second ring member; (e) a collar having a vertically disposed central opening with the collar being secured to the periphery of the first ring member. The collars of the support ring assemblies are selectively vertically adjustably secured to the post so that the spacing between the support ring assemblies may be varied.

The tomato plant extends upwardly through the first horizontally disposed ring members of the support ring assemblies as the plant grows. The vines, leaves and tomatoes of the tomato plant are supported upon the plurality of the circular support ring assemblies.

It is therefore a principal object of the invention to provide an improved plant support structure.

A further object of the invention is to provide an improved tomato plant support structure.

A further object of the invention is to provide a tomato plant support structure which includes a plurality of vertically spaced-apart support ring assemblies which are selectively vertically adjustably mounted on a post which extends upwardly from the ground.

A further object of the invention is to provide a tomato plant support structure of the type described wherein the vines, leaves and the tomatoes of the tomato plant are supported on the vertically spaced-apart support ring assemblies.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a perspective view of one of the support ring assemblies of this invention;

FIG. 3 is a side view of the support ring assembly of FIG. 2;

DESCRIPTION OF THE PREFERRED EMBODIMENT

Figure 1:
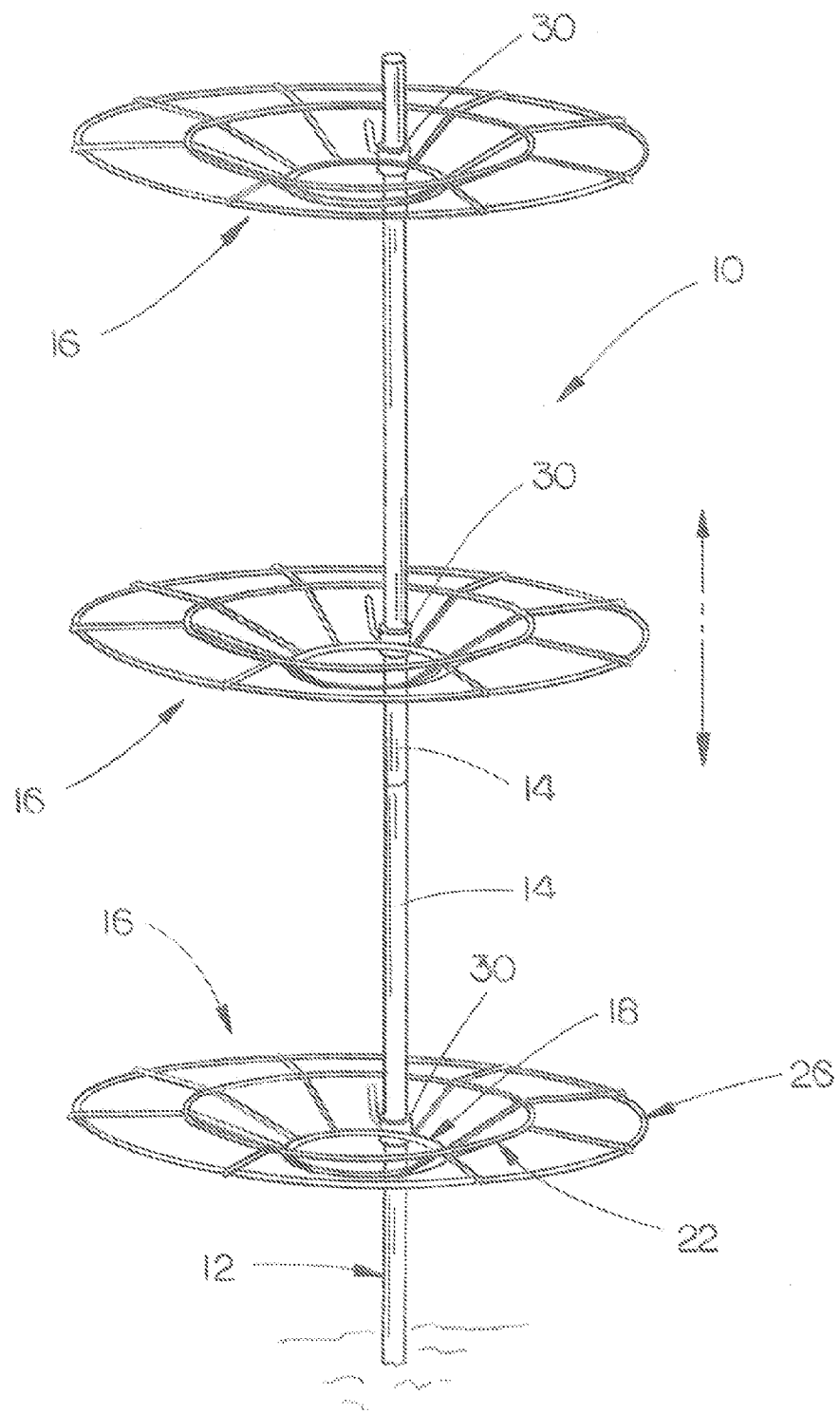
FIG. 1 is a perspective view of the tomato plant support structure of this invention.
Figure 4:
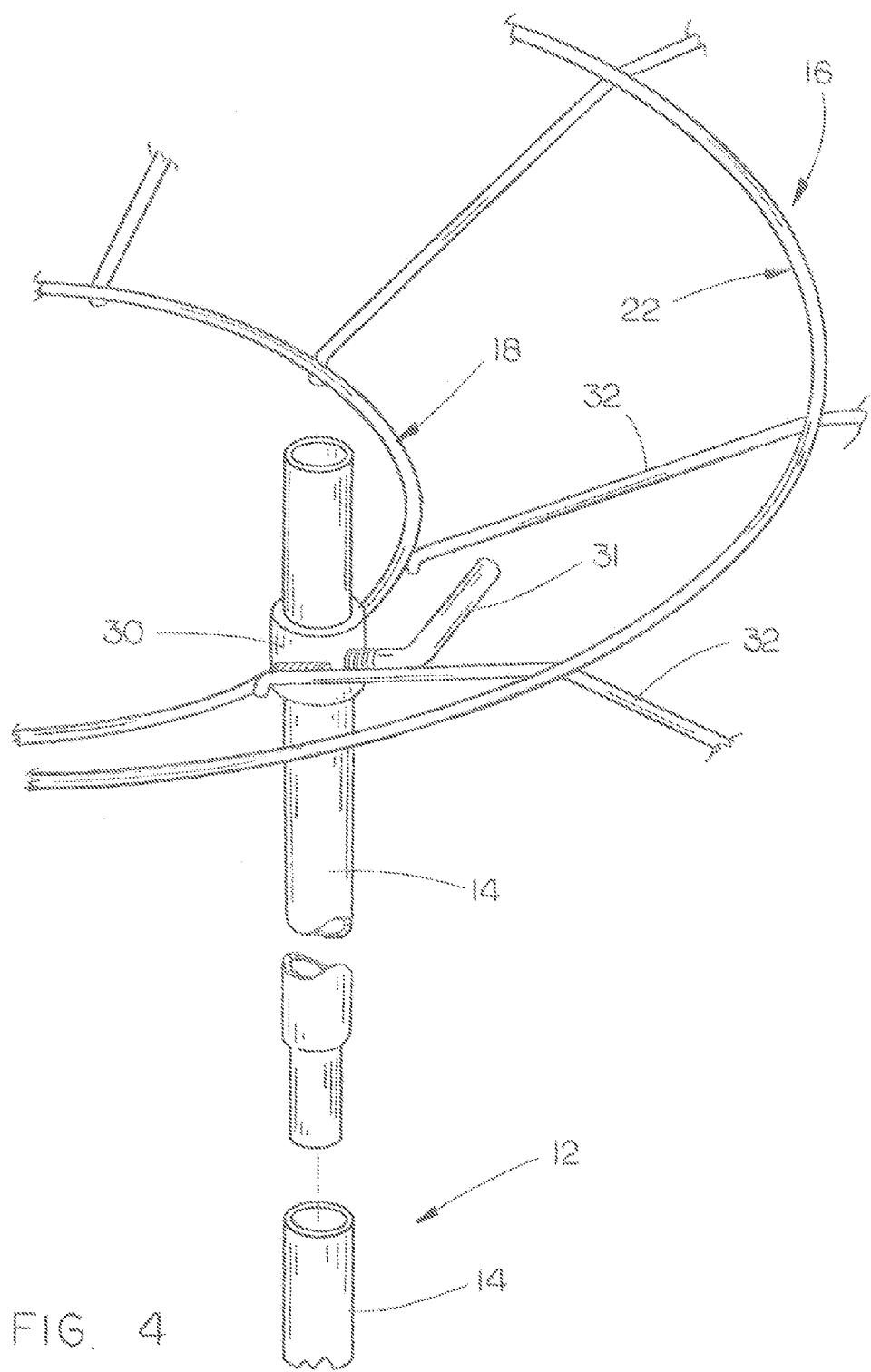
FIG. 4 is a partial exploded perspective view of the invention.
Figure 5:
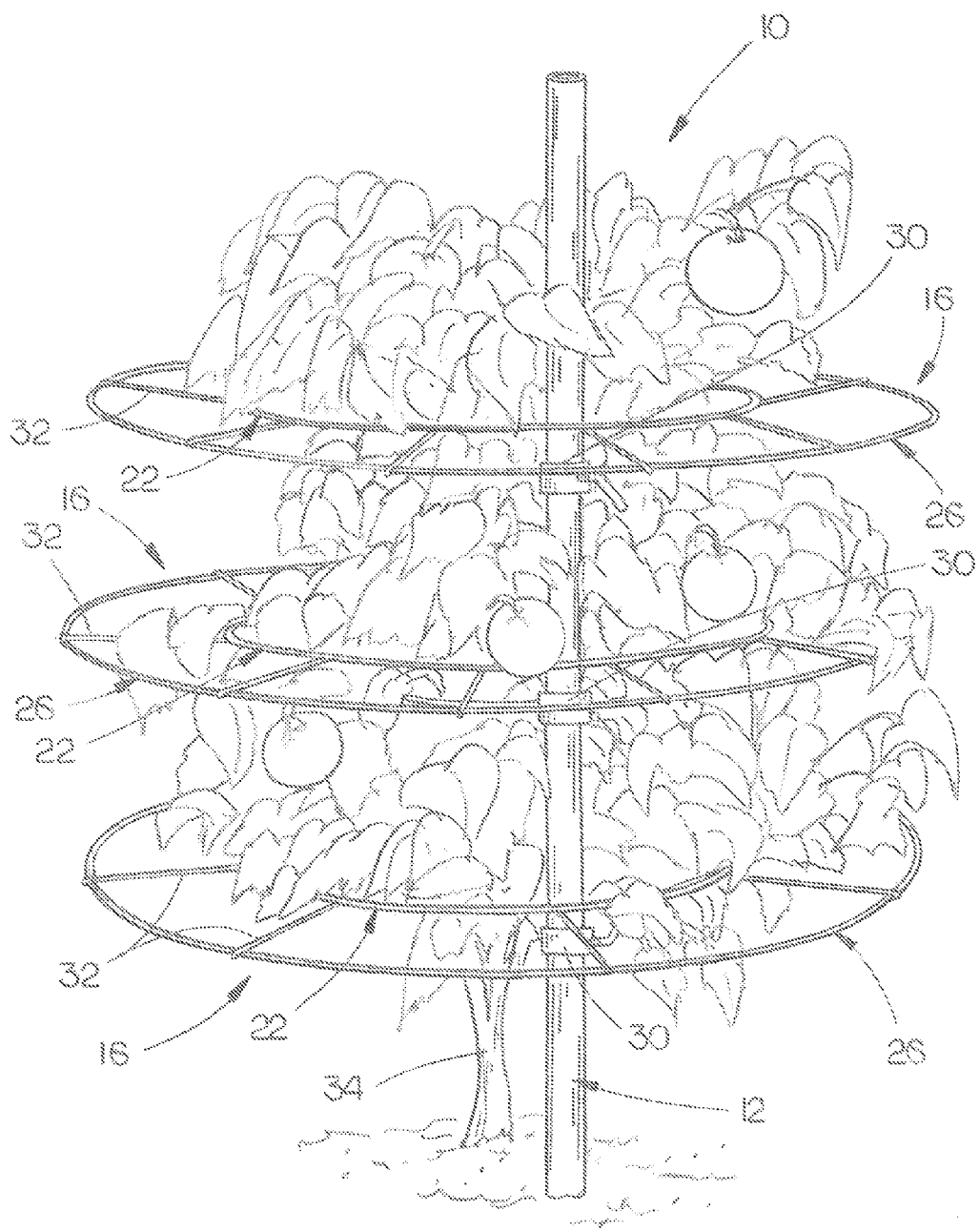
FIG. 5 is a perspective view of this invention illustrating a tomato plant being supported thereon.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The tomato plant support structure of this invention is generally designated by the reference numeral 10. Although the support structure 10 is ideally suited to support a tomato plant, the structure 10 could also be used to support plants other than tomato plants. The numeral 12 refers to a vertically disposed support post which is preferably comprised of a plurality of post sections 14 selectively secured together in an end-to-end relationship. The lower end of post 12 is preferably tapered or pointed to enable the post 12 to be driven into the ground.

Plant support structure 10 includes a plurality of vertically spaced-apart and horizontally disposed identical circular support ring assemblies 16. Inasmuch as each of the support ring assemblies 16 are identical, only a single support ring assembly 16 will be described in detail. Support ring assembly 16 includes a first horizontally disposed ring member 18 having a periphery 20. The numeral 22 refers to a second horizontally disposed ring member having a periphery 24. Ring member 22 has a greater diameter than the diameter of ring member 18 and is preferably positioned in a plane above the plane of ring member 18 in a concentric manner with respect thereto. The numeral 26 refers to a third ring member having a periphery 28. Ring member 26 has a greater diameter than the diameter of ring member 22. Preferably, ring member 26 dwells in substantially the same plane as ring member 22 in a concentric manner.

A vertically disposed collar 30 is welded to the periphery 20 of ring member 18 as seen in the drawings. A locking screw or bolt 31 is associated with collar 30 as will be described in detail hereinafter.

Each of the support ring assemblies also include a plurality of elongated rods 32 which have their inner ends welded to periphery 20 of ring member 18 in a radially spaced-apart manner so as to extend radially outwardly therefrom. The outer ends of the rods 32 are welded to the periphery 28 of ring member 26. The rods 32 are also welded, intermediate their inner and outer ends, to periphery 24 of ring member 22. Preferably, the inner end of one of the rods 32 is welded or otherwise secured to collar 30.

Initially, the lower end of the lowermost post section 14 will be driven into the ground at one side of the tomato plant 34 which has already been planted. The lowermost support ring assembly 16 is then secured to the lowermost post section 14 by slipping the collar 30 onto the post section 14. The locking screw or bolt 31 is then tightened to secure the collar 30 to the post section 14. At that point, the ring member 18 of the lowermost support ring assembly 16 will be centered over the plant 34 with the post section 14 being positioned laterally of the plant 34. At that time, there is no need for other post sections 14 to be secured to the lowermost post section 14.

As the plant 34 grows, the plant 34 will grow upwardly through the ring member 18 with portions of the plant being supported by ring member 18, rods 32, ring member 22 and ring member 26. As the plant grows, another post section 14 will be secured to the lowermost post section 14 and will have one or more, support ring assemblies 16 mounted thereon in a vertically spaced-apart manner.

The support ring assemblies 16 may be selectively vertically adjusted with respect to post 12 by moving the collars 30 upwardly or downwardly on the post 12. As the plant grows upwardly through the ring member 18 on the post 12 above the lower ring assembly 16, the leaves and tomatoes thereon will be supported by the ring member 18, rods 32, ring member 22 and ring member 26 of the next above support ring assembly 16. The growing and supporting process is repeated for the ring assemblies 16 thereabove.

The tomato plant support structure 10 of this invention supports the tomato plant and the tomatoes on the vertically spaced-apart support ring assemblies 16 to ensure the growth of the plant.

Thus it can be seen that the invention accomplishes at least all of stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A plant support structure comprising:
   an upstanding post having a lower end for insertion into the ground and an upper end;
   a plurality of identical, vertically spaced-apart circular support ring assemblies secured to said post;
   each of said support ring assemblies comprising:
   a. a collar having a vertically disposed central opening;
   b. said collar being selectively vertically adjustably secured to said post;
   c. a first horizontally disposed ring member having a periphery;
   d. said collar being secured to said periphery of said first horizontally disposed ring member;
   e. a plurality of elongated and radially spaced-apart rods;
   f. each of said rods having an inner rod portion with inner and outer ends, and an outer rod portion, with inner and outer ends, which extends horizontally outwardly from said outer end of said inner rod portion;
   g. said inner end of said inner rod portion of one of said rods being secured to said collar;
   h. said inner rod portions of said rods extending upwardly and outwardly from said first ring member;
   i. a second horizontally disposed ring member which has a greater diameter than said first ring member;
   j. said second ring member dwelling in a vertical plane above and outwardly of said first ring member;
   k. said second ring member being secured to a juncture of said inner and outer rod portions;
   l. a third horizontally disposed ring member which has a greater diameter than said second ring member;
   m. said third ring member dwelling in the same vertical plane as said second ring member and outwardly thereof;
   n. said third ring member being secured to said outer ends of said outer rod portions of said rods; said post is comprised of a plurality of post sections selectively secured together in an end-to-end relationship.

2. The plant support structure of claim 1 wherein the plant support structure is a tomato plant support structure.

* * * * *